United States Patent [19]
Lonn et al.

[11] Patent Number: 5,777,332
[45] Date of Patent: Jul. 7, 1998

[54] AUTOMATIC PATIENT ALIGNMENT DURING NUCLEAR IMAGING BODY CONTOUR TOMOGRAPHY SCANS

[75] Inventors: Albert Henry Roger Lonn, Beaconsfield, United Kingdom; Alan Thompson, Pewaukee, Wis.

[73] Assignee: General Electric Company, Milwaukee, Wis.

[21] Appl. No.: 689,664

[22] Filed: Aug. 13, 1996

[51] Int. Cl.$^6$ ............... G01T 1/166; G01T 1/164
[52] U.S. Cl. ................... 250/363.04; 250/363.05
[58] Field of Search ................ 250/363.05, 363.04

[56] References Cited

U.S. PATENT DOCUMENTS

| | | |
|---|---|---|
| 4,216,381 | 8/1980 | Lange . |
| 4,503,331 | 3/1985 | Kovacs, Jr. et al. . |
| 4,645,933 | 2/1987 | Gambini et al. ............ 250/363.05 |
| 4,652,758 | 3/1987 | Barfod . |
| B1 4,216,381 | 9/1988 | Lange . |

FOREIGN PATENT DOCUMENTS

| 61-142487 | 6/1986 | Japan ................ 250/363.04 |
|---|---|---|

OTHER PUBLICATIONS

"SPECT Resolution and Uniformity Improvements by Noncircular Orbit," Stephen C. Gottschalk, David Salem, Chun Bin Lim, and Robert H. Wake, *The Journal of Nuclear Medicine*, vol. 24, No. 9, pp. 822–828.

"Uniformity Artifact Reduction With Noncircular Tomographic Detector Motion," G.T. Gullberg, *The Proceedings of the 30th Annual Meeting –The Journal of Nuclear Medicine*, p. P104., 1983.

"Noncircular Orbits in SPECT," in Letters to the Editor, *The Journal of Nuclear Medicine*, p. 632, 1983.

*Primary Examiner*—Constantine Hannaher
*Attorney, Agent, or Firm*—John S. Beulick; John H. Pilarski

[57] ABSTRACT

Methods and systems for performing a tomographic scan which allow an operator to define a non-circular orbit so that a detector can be positioned close to a patient at each view are described. Such methods and systems provide that the patient to detector distance is reduced, which improves spatial resolution for the scan. In one embodiment, and to achieve a non-circular orbit, the camera and table/patient are moved with respect to one another. Specifically, the table is pinned in position and set to lateral and vertical positions during set-up. The same lateral and vertical table positions are maintained during the scanning phase. To get the camera closer or farther from the patient/table, the camera is pitched in or out. The camera head is tilted to achieve a tilt angle of zero degrees for all changes in pitch. As the camera pitches in and out, the central axis of the camera moves along the longitudinal axis of the table. To compensate for movement of the camera central axis, the table is extended or retracted longitudinally.

19 Claims, 3 Drawing Sheets

AUTOMATIC PATIENT ALIGNMENT DURING NUCLEAR IMAGING BODY CONTOUR TOMOGRAPHY SCANS

FIELD OF THE INVENTION

This invention relates generally to medical imaging and more particularly, to aligning the image detector with the patient during nuclear tomography imaging to optimize the detector image performance.

BACKGROUND OF THE INVENTION

In nuclear emission tomography, gamma cameras or detectors typically are used for locating and displaying human glands and organs and associated abnormalities. Abnormalities may be represented by higher uptake or lower uptake than the surrounding tissue. More specifically, and with respect to using a gamma camera, gamma-ray-emitting tracer material is administered to a patient, and the tracer material is more greatly absorbed by the organ of interest than by the other tissues. The gamma camera generates data, or an image, representing the distribution of such tracer material within the patient.

A gamma camera includes a multi-channel collimator and a gamma ray detector which converts energy from the gamma ray into an electrical signal which can be interpreted to locate the position of the gamma ray interaction in the planar detector. One known gamma ray detector which is commonly used is an Anger gamma camera, which is described in H. O. Anger, "Scintillation Camera", Rev. Sci. Instrum., Vol. 29, p. 159 (1958). Another known detector is a multi-crystal scintillation detector which has an array of small crystals coupled to an array of light detectors, which may be either photomultipliers or photodiodes. Yet another known detector is a solid-state position sensitive detector which converts energy from the gamma ray into an electrical charge which can be detected by an array of contacts.

The Anger gamma camera includes a large scintillation crystal responsive to radiation stimuli, i.e., gamma rays emitted by the patient. An array of photomultiplier tubes typically are optically coupled to the crystal. In operation, the gamma rays emitted by the patient in the direction of the detector are collimated onto the crystal, and each gamma ray which interacts with the crystal produces multiple light events. The multiple light events are detected by photomultipliers adjacent to the point of interaction. The photomultiplier tubes, in response to the light events, produce individual electrical outputs. The signals from the array of photomultipliers are combined using analog and digital circuitry to provide an estimate of the location of the gamma ray event. Further analog and digital processing is used to produce more accurate position coordinates to form the acquired image.

More particularly, to generate an image, a representation of the distribution of events in the crystal is generated by utilizing a matrix of storage registers whose elements are in one-to-one correspondence with elemental areas of the crystal. The crystal elemental areas are identified by coordinates. Each time a light event occurs in the crystal, the event coordinates are identified and the register in the storage register matrix corresponding to the identified event coordinates is incremented. The contents of a given register in the matrix is a number that represents the number of events that have occurred within a predetermined period of time within an elemental area of the crystal. Such number is directly proportional to the intensity of radiation emitted from an elemental area of the radiation field. The number stored in the register therefore is used to establish the brightness of a display picture element corresponding to the crystal elemental area. The distribution of a radiation field is displayed in terms of the brightness distribution of the display.

In emission tomography a plurality of such images are taken at various view angles around the organ of interest. Typically, in transaxial tomography, a series of images, or views, are taken at equal angular increments around the patient. The series of views around the patient are reconstructed to form transaxial slices, that is, slices across the axis of rotation. The process of acquiring the views and reconstructing the transaxial slices is termed emission computed tomography (ECT) or single photon emission computed tomography (SPECT). Similar reconstruction concepts are employed in X-ray computed tomography (CT) in which X-rays are used to measure patient attenuation and to reconstruct the attenuation in transverse sections.

Most detectors used for tomography are fixed to a large bearing which allows the detector to rotate about a fixed axis (roll axis) in order to acquire the views at different angles. A particular form of gantry, known as a ring stand, allows the detector to rotate and also swivel (tilt) and pitch in order to be able to image various organs in different patient attitudes. The ring stand can be used in connection with a patient table having its long axis parallel to the roll axis, and the detector can be brought close to the patient by adjusting the pitch axis.

The collimators used in known cameras and detectors have a multiplicity of holes through which gamma rays can pass. The holes are separated by dense material, typically lead, which attenuates the gamma rays and absorbs a large fraction of the gamma rays which impinge on the dense material. The dimensions of the openings and the thickness of the lead between the holes are selected to obtain an appropriate trade-off between resolution and sensitivity as well as to minimize the penetration through the walls of the holes. Typically, the collimators are exchangeable and the operator can select a most appropriate collimator for the imaging application and the energy of the gamma rays. The array of collimator holes are typically parallel with one another, but some collimators are arranged so that the openings converge at a line or point some distance from the collimator front surface so as to obtain some magnification of the patient.

Known multi-channel collimators used in emission imaging have an image resolution which degrades linearly with an increasing distance of the object from the collimator surface. It is beneficial, therefore, to acquire each view with the collimator as close to the patient as possible.

For emission tomography imaging, in addition to positioning the collimator as close to the patient as possible, it is important that the data be acquired with the collimator holes viewing substantially transverse to the axis of rotation. When the pitch axis is changed, the direction of the collimator holes will change in the longitudinal direction by the same angle as the change in the arm angle. If the camera is mounted on a ring stand, the operator sets the collimator face parallel to the axis of rotation every time the pitch axis is changed. In a self levelling system, encoders and motors detect and control the locations of the tilt and pitch axes so that the tilt can be changed to compensate for the change in pitch and maintain the collimator face parallel to the axis of rotation. This configuration allows the radius of the orbit to be set and a tomography scan to be performed at a fixed radius of rotation.

Most portions of the patient which are scanned, however, do not have circular cross-sections. Therefore, a fixed orbit results in the collimator being close on a few views, and much further away on other views. The problem is most severe when scanning the thorax of wide, thin people since the detector must scan at a large radius to clear the shoulders, which then results in a large distance from the anterior and posterior patient surfaces, giving poor resolution in those views. This results in a loss of image contrast in the transaxial section which is reconstructed from the series of images.

Known methods of establishing a non-circular orbit around a patient include the method described in U.S. Pat. No. 4,503,331. In the above referenced patent, a method is described in which a camera that rotates around a patient is also moved laterally by means of rails to achieve a non-circular orbit around the patient with the intention of fitting this orbit more closely with the patient surface. The lateral gantry movement, however, is not usually provided on ring stand gantries. Therefore, in order to implement lateral gantry movement, additional rails, motors and control circuits are required. These additional components, of course, increase the cost of the system. In addition, the rails may possibly obstruct the free movement of patient trolleys in the vicinity of the gantry. Further, with the above described method, a simultaneous (or continuous) type scan is generally not feasible since the object typically is not within the center of the camera's field of view, i.e., the patient may have to be adjusted for each view thus requiring a step and shoot type scan rather than enabling a continuous scan.

In another known method, a known ring stand, described in U.S. Pat. No. 4,216,381, which is a rotating ring stand gantry, can be used with a known imaging table to perform patient body contour scanning. Particularly, motors and encoders on the patient table control lateral and vertical motions to move the patient close to the detector for each view, thus achieving improved resolution as described in U.S. Pat. No. 4,652,758. Both U.S. Pat. Nos. 4,216,381 and 4,652,758 are assigned to the present assignee. Such scanning, however, requires careful operator setup since the table vertical and lateral motions are used both to center the organ of interest in the image and to bring the patient close to the detector. Moving a patient laterally and/or vertically during scanning also can create patient stress.

Further, most known patient tables can be moved vertically for patient loading and unloading, and this vertical motion can also be used to bring the patient close to the detector at all angles. If vertical motions alone is used, the position of the patient center will shift laterally by differing amounts, depending on the roll angle and the amount of vertical shift. Such lateral image shift is undesirable since the shifting must be recorded and compensated for in the transaxial reconstruction process. Also, a lateral image shift will reduce the effective field of view and may truncate the patient image.

To compensate for this lateral image shift, a lateral table movement may be employed so that the effective patient shift at each view can always be in the direction of the collimator holes and no lateral image shift occurs. In this type of scan, the detector rotates at a fixed radius, and vertical and lateral table motion is used to move the patient in the direction of the collimator holes so as not to introduce a lateral image shift. When the detector is rotated, a lateral shift is introduced so the table motion for successive views must compensate for the previous shift and the resultant motion does not shift the patient center. Of course, the table must move the patient out of the way before detector rotation. A large lateral motion may be required to accommodate thin patients with wide shoulders.

In the above described method of scanning, the detector orbit around the patient is achieved by rotating the detector and then moving the patient toward the detector. Known methods to determine the orbit around the patient include the following methods.

1. The lateral width and anterior -posterior width of the patient and the supporting table are measured. The patient is assumed to have an elliptical cross-section. The orbit is calculated so that the detector is a tangent to this ellipse. The measurement of the patient is typically performed using the table and gantry motions to move the detector and patient together, and then the gantry and table positions are recorded by the controlling computer.
2. The patient is measured as described in Paragraph 1, above, but the computation of the orbit assumes the object is some other shape, for example, a rectangle.
3. The patient is measured as described in Paragraph 1, above, but the computation of the orbit assumes the object is an irregular shape, for example, an ellipse for the upper half and a rectangle for the lower half to accommodate a flat imaging table.

The methods described above use a limited number of measurements and assume the patient outline fits into some predetermined shape. There is obviously a risk that the actual patient scanned would be larger or smaller at some points than the predicted size, and so there is the risk of either collision or loss of resolution.

Additional known methods measure the appropriate pitch at every view and thus produce an optimum detector-patient distance for each view. The known methods are described below.

4. The camera pitch is set, measured and saved at every view prior to acquisition. During acquisition, the camera pitch is set to the saved pitch at each angle. This method sometimes is referred to as a "learn mode" scan.
5. This method does not require any measurements prior to scanning. Rather, the operator centers the patient and sets the gantry for the first view, and at each subsequent view:
   a. the camera is pitched in until a sensor on the collimator detects the patient (or table, or any other obstruction),
   b. the view is acquired,
   c. the camera is pitched out to obtain clearance to rotate, and
   d. the camera is rotated to the next view.

The sensor referred to above could be a proximity sensor consisting of a multiplicity of light beams and light sensors a small distance above the surface of the detector which would send a signal to the controlling computer when a portion of the patient or table intercepted a light beam and obstructed the passage of light from a source to a sensor. This method is generally referred to as "auto sensing" since the operator does not have to take any measurements prior to scanning.

The above described learn mode scan requires a tedious and time consuming set-up. Further, although the setup may be easier with auto sensing, there is still a potential to shift the patient center, particularly if resultant motion is employed to move the patient to a next position and a collision is detected before compensating for the lateral image shift. Although it would be easier to use the pitch axis to reduce the distance at each view, if the pitch axis is adjusted on the ring gantry, the imaged part of the patient shifts longitudinally so that the lines of data in successive views do not correspond to the same transaxial slice.

It would be desirable to provide an easy to set-up, substantially automated, patient alignment system for use in nuclear emission tomography scans. It also would be desirable to provide such a system which facilitates reconstructing images having good resolution and does not necessarily require that a patient be moved laterally or vertically during the scan.

SUMMARY OF THE INVENTION

These and other objects may be attained by a method of performing a tomographic scan in which the pitch axis is adjusted to bring the detector close to the patient at every view. The detector tilt is adjusted with the pitch axis so that the collimator face is parallel to the axis of rotation. To compensate for longitudinal displacement of the imaged portion of the patient, the patient is moved longitudinally. The longitudinal axis is provided with motors and encoders to measure the longitudinal travel of the table in the direction of the roll axis.

Since the functions of the different axis motions are separate, the patient set-up is simple. Specifically, table height and lateral drives are used to center the organ of interest, and the pitch is used to bring the detector close to the patient. At each view, the detector pitches to come close to the patient to provide the best resolution. The longitudinal shift is compensated for by longitudinal table motion so that the organ of interest can always be in the image area. Since the pitch direction is in the direction of the collimator holes, no lateral or vertical patient motion is required during a scan. Also, there is no shift in the image and no loss of field of view to be compensated for by the reconstruction process.

DETAILED DESCRIPTION OF THE DRAWINGS

The present invention, in one aspect, is a method for performing a tomographic scan which allows an operator to define a non-circular orbit so that a detector can be positioned close to a patient at each view. As a result, the patient to detector distance is reduced, which improves spatial resolution for the scan. In comparison, with a circular tomographic scan, the table is pinned in a fixed position and the detector maintains a constant distance from its center of rotation, as it rolls to each view position. The circular arc of the detector must encompass the patient and table, and for certain sections of the arc of scan, the patient's body may be several inches away from the camera.

To achieve a non-circular orbit, and in accordance with one embodiment of the present invention, the camera and table/patient are moved with respect to one another. Specifically, the table is pinned in position and set to lateral and vertical positions during set-up. The same lateral and vertical table positions are maintained during the scanning phase.

To get the camera closer or farther from the patient/table, the camera is pitched in or out. The camera head is tilted to achieve a tilt angle of zero degrees for all changes in pitch. As the camera pitches in and out, the central axis of the camera moves along the longitudinal axis of the table. To compensate for this movement, the table is extended or retracted.

Figure 1:
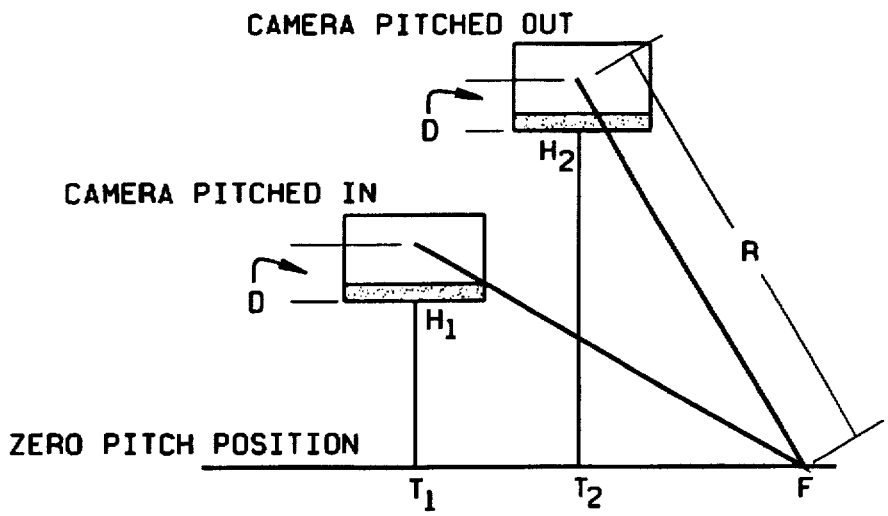
FIG. 1 illustrates the longitudinal displacement associated with camera pitch.

Referring to FIG. 1, a schematic illustration of camera pitch and the associated longitudinal displacement is shown. Specifically, the camera position when pitched in and when pitched out is shown. There is a longitudinal displacement of the camera view, as represented by the displacement of $T_1$ and $T_2$, between the pitched in and pitched out conditions. In order to keep a body part centered in the camera view for such different pitches, the body part must be moved longitudinally.

The present method provides the important advantages that the camera (i.e., detector) can be positioned close to the patient at each view and that the patient is moved only longitudinally, and not laterally or vertically, during a scan. In addition, with the above described variable pitch method, the camera pitch axis has a greater range than the other axes so that complex outlines can be defined. Further, after the table has been centered laterally and then positioned vertically so that the patient lies within the camera field of view, only the camera needs to be moved, during set-up, to define the required orbit.

Set forth below is a description of operator actions and system responses required to perform the setup for a body contour tomographic scan. This set-up relates to both a step-and-shoot type body contour scan and a continuous type body contour scan. The method described below can be practiced in connection with many imaging systems, including on nuclear imaging systems, such as the GEMS Millennium System, commercially available from GE Medical Systems, 3000 North Grandview Blvd., Waukesha, Wis. 53188. The GEMS Millennium System includes a scintillation detector mounted on a rotating ring stand gantry, a number of removable collimators, a patient table, and a control computer coupled to the gantry and table for recording and controlling movement of the gantry and table. The rotating ring stand detector has power drive and computer control of detector pitch and tilt and rotation (roll) , and the table has power drive and computer control of the longitudinal axis. Additionally, for patient positioning, the table has power drive and operator control of the table vertical and lateral motion. The system also includes a hand-held controller for moving the patient table and gantry during set-up and a key on the hand held controller marked <SET> which is used by the operator to indicate to the controlling computer that a set-up task is complete. The collimator and some parts of the gantry are fitted with collision sensors which detect when an object meets the surface of the sensor with a pre-determined force. Optionally, the collimator may be fitted with proximity detectors which detect when an object approaches the face of the collimator.

The set-up for a patient body contour tomographic scan in accordance with the present invention requires that the operator specify the acquisition arc over which data will be taken, and the number of views (steps) that will be taken. The operator may also specify a gantry starting angle or the start position may be set using the hand-held controller.

In order to determine the patient/table outline, the system uses four reference positions. These are at gantry roll positions of −90, 0, +90 and +180 degrees. For each reference position, the system:
1. pitches the detector out,
2. moves the detector tilt to zero,
3. rotates the gantry to −90, 0, +90 or +180 degrees, and
4. centers the table laterally.

The system then waits for the operator to pitch the detector in to the patient/table outline and to mark the position by pressing the SET key on the hand-held controller. When the SET key is pressed, the system records the positions of all axes.

The system uses the positions of the axes at the four marked reference positions to produce an ellipse for the upper half of the outline. The lower half of the outline (the table) is fitted with a shape based on the table cross-sectional dimensions.

The outline could be determined with fewer or more reference positions, or with reference positions taken at other gantry angles. For example, reference positions could be taken at each view position, i.e., a learn mode. The outline could also adopt an arbitrary shape by using a shape other than the ellipse. In addition, different shapes could be used for different segments of the outline. The method of determining the outline could also employ an auto-sensing mechanism which allows positioning of the detector close to the outline without requiring pre-determined reference positions.

When using the four reference points to determine the patient/table outline, the first reference position is at the −90 degree gantry roll angle, which allows the operator to drive the table vertical and longitudinal axes, using the hand-held controller, to center the patient within the detector field of view. Markings on the face of the collimator help with the alignment.

Referring to FIG. 1, as the camera changes pitch, the detector must tilt in order to keep the detector parallel with the longitudinal axis. There is also an apparent motion along the longitudinal axis which must be compensated by moving the table longitudinally. When the first reference position is marked, the relationship between the detector pitch and the table longitudinal position is established by the system. It should be noted that during the set-up stage, the system does not move the table longitudinally as the detector pitch changes. Such movement is only required during the scanning stage.

At the second, third and fourth reference positions, the operator only needs to pitch the detector in and then press the SET key to mark the position. The patient should remain centered within the detector field of view. It should not be necessary to move any other axes. However, table motion using the hand-held controller is not prevented. This allows the operator to extract the patient in an emergency, or to fine tune the centering of the patient. This means that the table vertical and lateral positions may change between marking of reference positions and these movements must be taken into account when the outline is determined.

Although the lower half of the outline is fitted with the table shape and the table dimensions and table vertical and lateral positions are known, the exact position of the underside of the table cradle cannot be determined. The table cradle is displaced downwards (sag) due to the weight of the patient. This sag increases with patient weight and as the table cradle is extended longitudinally. The +180 degree reference position must be marked to establish the position of the underside of the table cradle.

After all reference positions have been marked, the system moves the gantry to the starting angle (if previously specified by the operator), or the operator moves the gantry to the start angle. When the gantry has reached the start angle or the operator has confirmed that the gantry is in position, the system will read the current positions of the table vertical and lateral axes and store these as the base table positions to be used in the outline determination.

Figure 2:
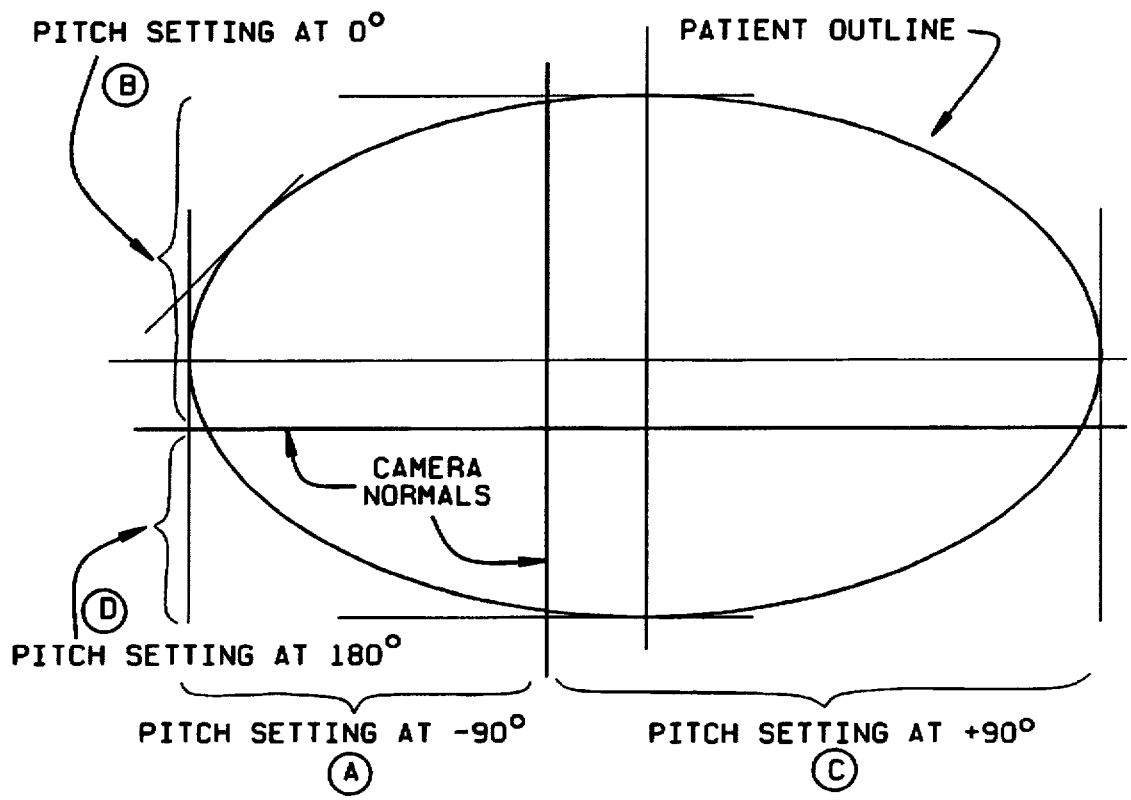
FIG. 2 illustrates reference positions used in body outline fitting.

Referring to FIG. 2, the pitch positions of the reference points must be adjusted so that they are all based on the same table vertical and lateral positions. At the start of the scan, the table vertical and lateral positions are determined again and the pitch positions re-adjusted. These table vertical and lateral positions are then fixed throughout the scan.

The camera is assumed to rotate about its zero pitch position. This relationship typically is set when the pitch axis is characterized after installation of the system. This is not necessarily the center of the ellipse describing the orbit, since the pitch positions at opposing reference points may not always be equal.

The center of the ellipse is determined using the midpoints of opposing reference positions, after adjusting for table movement during set-up. Assuming that the pitch settings at the −90°, 0°, +90° and +180° reference positions are A, B, C and D, respectively, and using the coordinates based at the center of rotation of the camera, an ellipse can be constructed with center at $(-A+(A+C)/2, -D+(D+B)/2)$ with a major axis length of $(A+C)$ and a minor axis length of $(B+D)$.

The coordinates for a series of points on the ellipse are determined using values of x ranging from 0 to its upper limit (along the semimajor axis) in the ellipse formulae (coordinates with origin at center of the ellipse).

| | |
|---|---|
| $a = (A+C)/2$ | The semimajor axis length |
| $b = (B+D)/2$ | The semiminor axis length |
| $y = \pm \sqrt{b^2 - (b/a)^2 x^2}$ | |

Note that only positive values for y are needed, since negative values are for points lying on the lower half of the ellipse. Note also that due to symmetry, for each point (x,y) on the upper right-hand quadrant, there is another point (−x,y) on the upper left-hand quadrant of the ellipse. In one embodiment, for example, each quadrant of the ellipse may be approximated using 10 points.

Figure 3:
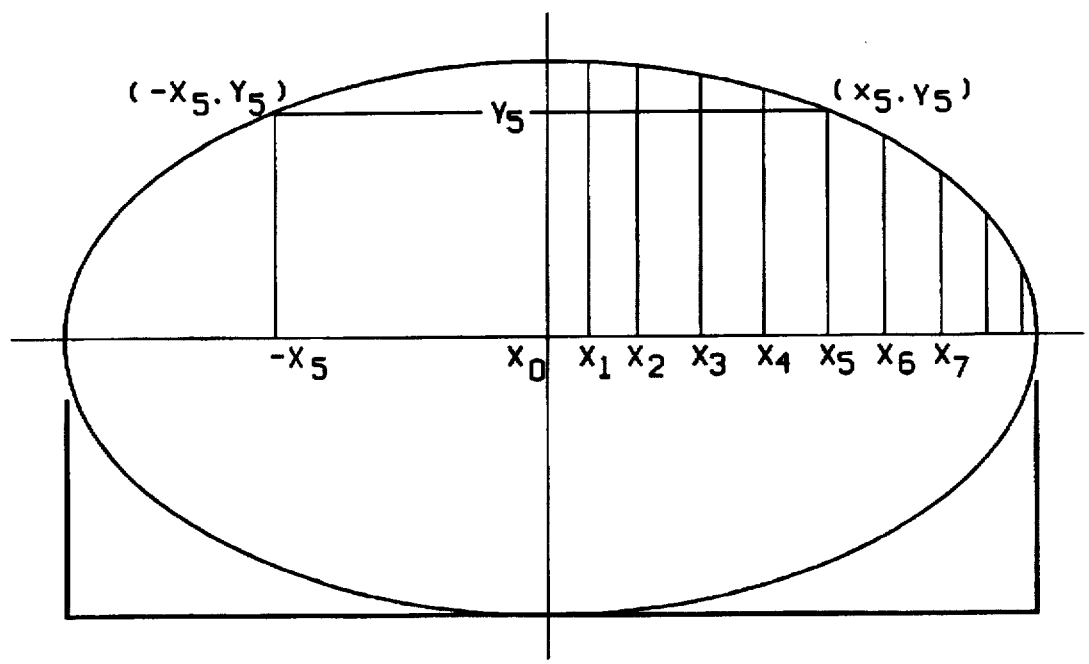
FIG. 3 illustrates a series of points on the ellipse and determined by the system during acquisition.

Referring to FIG. 3, a set of points is determined, lying on the ellipse, for the upper half of the outline. The coordinates of these points are all based at the center of the ellipse and must be translated to a coordinate system with the detector center of rotation as the origin. The lower half of the outline is pre-defined as a set of points derived from known table cradle dimensions and based on the underside of the table. However, these points also need to be translated to coordinates with the detector center of rotation as the origin and to take account of the table lateral position and table sag. Note that the table cradle outline is shown in FIG. 3 as a simple rectangle.

The camera (roll) angle for any view can be determined once the starting angle is known using the acquisition arc and the total number of views input on the acquisition card. The camera pitch position needs to be determined for any given gantry roll angle. The coordinates of the points defining the outline must be translated to coordinates using the camera center of rotation as the origin. For any given camera roll angle, the angle of the camera face is known and therefore a series of lines can be defined, with that slope, passing through each point defining the outline.

Figure 4:
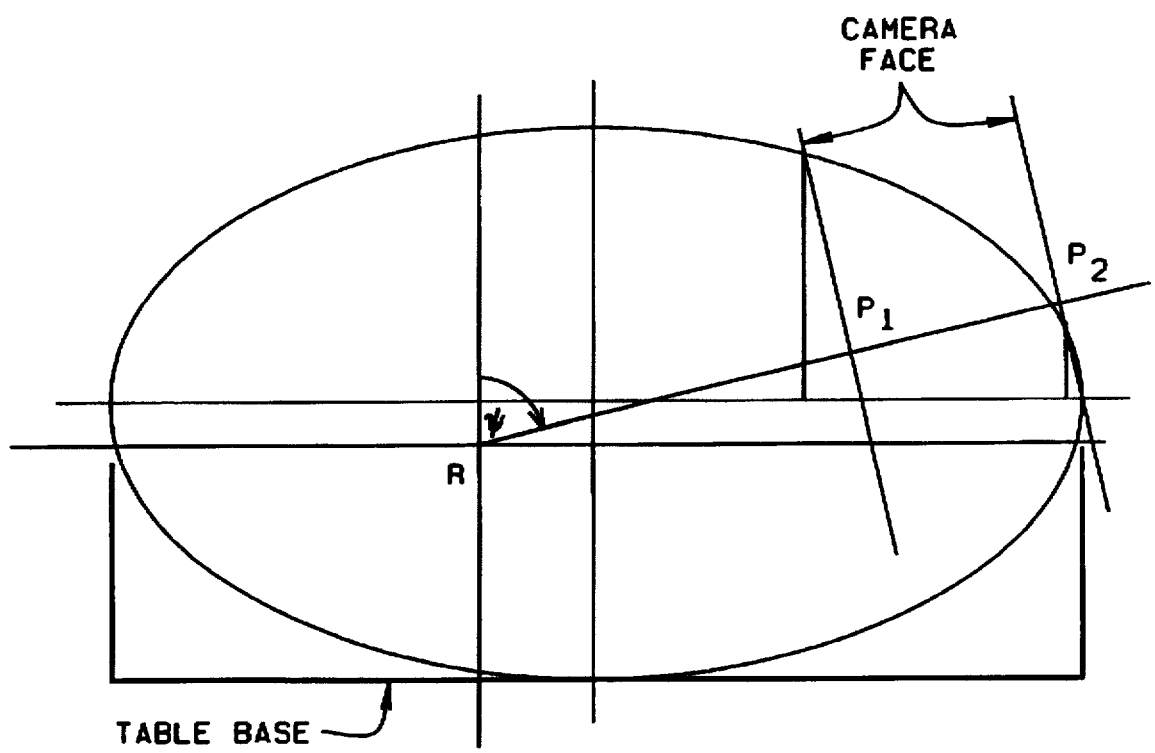
FIG. 4 is a diagram illustrating a method for determining camera pitch position.

Referring to FIG. 4, the line passing through an outline point represents the position of the camera, resting against that point but ignoring all other points defining the outline. The perpendicular distance between the line and the origin is the pitch distance for that point. The pitch distance for all outline points needs to be determined and the greatest of all these distances is the nearest that the camera may be pitched in to the outline. FIG. 4 illustrates the camera rolled to an angle $\psi$ along with lines parallel to the camera face, passing through two outline points (other points not shown for clarity). In this diagram, R represents the center of rotation for the camera, and $P_1R$ and $P_2R$ are the pitch distances for two of the outline points. These distances are measured from the origin along a line perpendicular to the camera face. These are not the distances between the origin and the outline points, which are independent of the gantry angle. In this example, $P_2R$ would be used as the pitch position since it is greater than $P_1R$.

Figure 5:
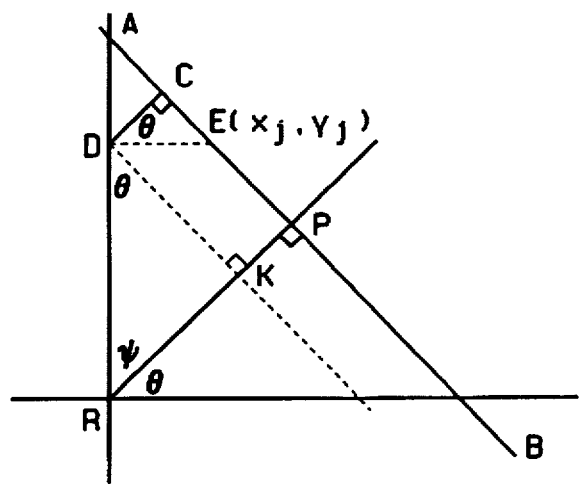
FIG. 5 is a diagram illustrating a method for determining the distance between the origin and the camera face.

FIG. 5 illustrates determining the distance between the origin and the camera face. The camera has been rolled to roll position $\psi$ so that the normal, RP, to the camera face, AB, makes an angle $\theta$ with the x-axis and intercepts the camera face at point P. The camera face also touches point E with coordinates $(x_j, y_j)$. The distance between the origin and the camera face, RP, is:

RP=RK+KP,

RP=RK+DC,

RP=DR*sin $\theta$+DE*cos $\theta$,

RP=$y_j$*sin $\theta$+$x_j$ cos $\theta$, for all values of $\theta$.

Therefore for any given gantry roll, the angle $\theta$ may be determined and then the pitch distance for each outline point may be determined. If the computed value of RP is negative for some outline point, it means that the camera needs to be pitched in beyond the center of rotation to reach it, i.e., the point is on the other side of the outline.

The gantry roll angle ($\psi$) is measured in degrees with zero (and 360) being when the gantry is at the 12 o'clock position and increasing clockwise. In the above equation, $\theta$ is in radians and is calculated using:

$\theta$=($\pi$/180)*(90−$\psi$)

As described above, when the camera is moved to a different pitch position, the table needs to be moved longitudinally in order to maintain the same position with respect to the patient.

Referring again to FIG. 1, the pitch position is the vertical distance between the face of a collimator and a horizontal line running through the gantry arm pivot. In the 'camera pitched in' position, the pitch $P_1$ is the distance $H_1T_1$ and in the 'camera pitched out' position, $P_2$ is $H_2T_2$. As the head is moved from a smaller $P_1$ to a larger $P_2$ pitch position, the table must be extended into the gantry ring, i.e., moved from a smaller to a larger longitudinal position. The distance to extend the table is $\sqrt{(R^2-(P_1+D)^2)}-\sqrt{(R^2-(P_2+D)^2)}$ where R is the length of the gantry arm and D is a constant equal to the distance between the point about which the head tilts and the outer surface of a collimator. If this table extension distance is negative, then the table must be retracted by that amount. As an example, in the GEMS Millennium System, D=130.2 and R=788.924 mm. Of course, other systems may have different gantry arm lengths R and distances D.

The non-circular tomographic scan described above provides the important advantages that the camera (i.e., detector) is positioned close to the patient at each view and that the patient is moved only longitudinally, and not laterally or vertically, during a scan. Also, since the patient is always centered laterally and vertically within the camera field of view, simultaneous (or continuous) scanning can be performed. In addition, the camera pitch axis has a greater range than the other axes so that complex outlines can be defined. Further, after the table has been centered laterally and then positioned vertically so that the patient lies within the camera field of view, only the camera needs to be moved, during set-up, to define the required orbit.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A method for performing a tomographic scan of an organ of interest of a patient with an emission tomographic system including a gantry having a detector secured thereto, a movable patient table, and a computer system coupled to the gantry and to the table to detect and control the position of the detector and table, the detector including a collimator, said method comprising the steps of:
   establishing a non-circular orbit detector path by varying detector pitch at a plurality of reference positions; and performing a scan by:
   controlling detector pitch so that the detector substantially follows the non-circular orbit path;
   controlling detector tilt so that the collimator face is substantially parallel with a detector axis of rotation;
   controlling longitudinal table motion so that the organ of interest is imaged in substantially the same transverse slices; and
   collecting data at a plurality of views on the non-circular orbit path.

2. A method in accordance with claim 1 wherein establishing the non-circular orbit detector path comprises the steps of measuring a plurality of pitch positions on the orbit prior to scanning and using a family of predetermined functions to define the orbit.

3. A method in accordance with claim 1 wherein establishing the non-circular orbit detector path comprises the steps of identifying patient dimensions and selecting the orbit from a series of predetermined functions.

4. A method in accordance with claim 1 wherein the non-circular orbit places the detector on a tangent to an outline of an ellipse which encompasses the patient and a polygon which encompasses the underside of the patient table.

5. A method in accordance with claims 1 wherein the non-circular orbit places the detector on a tangent to an outline formed by interpolating between measured points on the orbit path.

6. A method in accordance with claim 1 wherein establishing the non-circular orbit detector path comprises the steps of measuring a plurality of pitch position around the patient prior to scanning and repeating the pitch positions during scanning.

7. A method in accordance with claim 1 wherein establishing the non-circular orbit detector path comprises the step of using a proximity sensor to detect the patient surface as the detector is pitched in.

8. A method in accordance with claim 1 wherein collecting data at a plurality of views on the non-circular orbit path comprises the steps of:

pitching the detector out from a patient outline, rotating the detector to a next view angle, moving the table longitudinally, pitching the detector in to the orbit path, maintaining the tilt parallel to the axis of rotation, and acquiring the view.

9. A method in accordance with claim 8 further comprising the step of detecting whether a collision may occur, and if a possible collision is detected, then acquiring the view at a larger pitch than an initial predetermined pitch.

10. A method in accordance with claim 1 wherein the pitch, tilt and longitudinal movements are performed simultaneously.

11. A method in accordance with claim 1 wherein the pitch, tilt and longitudinal movements are performed sequentially in a selected order.

12. A method in accordance with claim 1 wherein the pitch, tilt and longitudinal movements are performed simultaneously with gantry rotation and data collection.

13. A method in accordance with claim 1 wherein the pitch, tilt and longitudinal movements are performed sequentially with gantry rotation and data collection.

14. An emission tomographic scan system for imaging an organ of interest of a patient, said system comprising a gantry having a detector secured thereto, a movable patient table, and a computer coupled to said gantry and to said table to detect and control the position of said detector and said table, said detector including a collimator, said computer programmed to perform a scan by:

controlling detector pitch so that said detector substantially follows a predefined non-circular orbit path;

controlling detector tilt so that the face of said collimator is substantially parallel with the detector axis of rotation;

controlling longitudinal table motion so that the organ of interest is imaged in substantially the same transverse slices; and collecting data at a plurality of views on the non-circular orbit path.

15. A system in accordance with claim 14 wherein said computer is programmed to locate said detector on a tangent to an outline of an ellipse which encompasses the patient and a polygon which encompasses the underside of said patient table.

16. A system in accordance with claim 14 wherein said computer is programmed to locate said detector on a tangent to an outline formed by interpolating between measured points on the orbit path.

17. A system in accordance with claim 14 wherein to collect data at a plurality of views on the non-circular orbit path, said computer is programmed to:

pitch said detector out from the patient outline, rotate said detector to a next view angle, move said table longitudinally, pitch said detector in to the orbit path, maintain the tilt parallel to the axis of rotation, and acquire the view.

18. A system in accordance with claim 14 wherein said computer is programmed to control the pitch, tilt and longitudinal movements in a selected mode, said selected mode being selected from a group of modes comprising simultaneous and sequential movements.

19. A system in accordance with claim 14 wherein said computer is programmed to control the pitch, tilt and longitudinal movements in a selected mode, said selected mode being selected from a group of modes comprising simultaneous gantry rotation with data collection, and sequential gantry rotation followed by data collection.

* * * * *